A. R. SCHRADER.
MILK BOTTLE ATTACHMENT.
APPLICATION FILED DEC. 27, 1919.
1,381,754. Patented June 14, 1921.
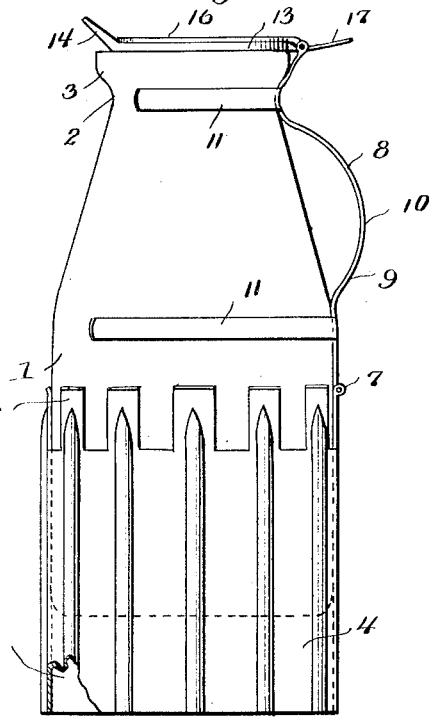
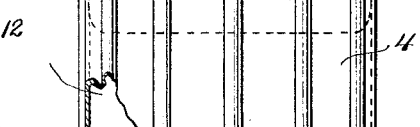
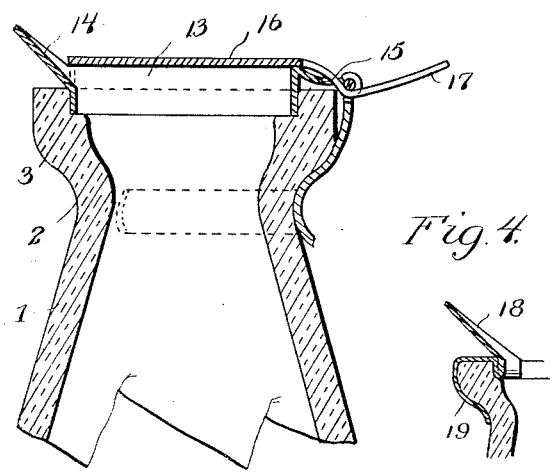
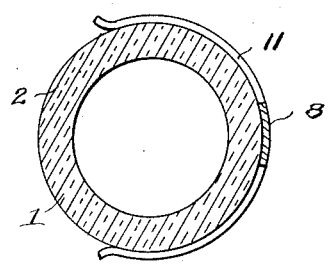
Inventor
Arthur R. Schrader
By Victor J. Evans
Attorney

UNITED STATES PATENT OFFICE.

ARTHUR R. SCHRADER, OF CHICAGO, ILLINOIS.

MILK-BOTTLE ATTACHMENT.

1,381,754.  Specification of Letters Patent.  Patented June 14, 1921.

Application filed December 27, 1919. Serial No. 347,653.

*To all whom it may concern:*

Be it known that I, ARTHUR R. SCHRADER, a citizen of the United States, residing at Chicago, in the county of Cook and State of Illinois, have invented new and useful Improvements in Milk-Bottle Attachments, of which the following is a specification.

This invention relates to an attachment for a milk bottle and has for its primary object the combining in a single article a closer for the bottle, a handle for carrying the bottle and a receptacle for supporting the bottle so as to be heated.

An object of the invention is to support the bottle in a manner that the same will not crack when subject to heat.

Besides the above my invention is distinguished for the novel manner of constructing the receptacle and associating therewith a clamping device for limiting the position of the bottle within the receptacle so that there will be an intervening air space between the bottom of the bottle and the bottom of the receptacle.

With these and other objects in view the invention will be better understood from the following detailed description taken in connection with the accompanying drawing wherein—

Figure 1 is the side elevation of a milk bottle showing my invention applied thereto.

Fig. 2 is a sectional view through the closer.

Fig. 3 is a sectional view through the neck of the bottle.

Fig. 4 is a detail section of a modified form of the invention.

Again referring to the drawing illustrating one construction of my invention #1 designates an ordinary milk bottle having a neck 2 and a bulged mouth portion 3. #4 designates a receptacle for engagement with the bottom portion of the bottle so that the latter may be supported on the stove to have its contents heated. This receptacle formed from sheet metal and has a plurality of prongs 5 at its upper edge to facilitate insertion of the bottle into the receptacle. The receptacle may be provided with or without a bottom 6. Hinged to the receptacle as illustrated at 7 is a clamping device 8 which consists of a strip 9 having a portion formed into a handle 10. Projecting from the strip are clamping bands 11 the upper of which engage directly under the bulged mouth portion so that the movement of the bottle into the receptacle will be limited so as to provide an air space 12 between the bottom of the bottle and the bottom 6 so that the bottle may be heated without same cracking. #13 designates a ring fitted into the mouth of the bottle and provided with a lip 14 and an extension 15, which is hinged to one end of the strip. A lid 16 covers the ring and is hinged to the strip so that when pressure is brought to bear upon the finger piece 17 the lid may be thrown to open position and thereby allow ready access to the contents of the bottle. From the foregoing description taken in connection with the accompanying drawing it will be apparent that I provide an attachment of simple construction that combines in a single article a closer for the mouth of the bottle, a handle for carrying the bottle and a device for supporting the bottle during the heating thereof.

It is of course, to be understood that the invention may be constructed in various other manners and the parts associated in different relations and, therefore I do not desire to be limited in any manner except as set forth in the claims hereunto appended.

Having thus described my invention what I claim is—

1. A milk bottle attachment comprising a heating receptacle encircling the bottom portion of the bottle, a clamp hinged to the receptacle, and a lid hinged to the clamp.

2. A milk bottle attachment comprising a heating receptacle encircling the bottom portion of the bottle, a clamp hinged to the receptacle, a lid hinged to the clamp, and a ring coöperating with the lid to cover the mouth of the bottle, and further provided with a lip to direct the flow of the milk.

3. A milk bottle attachment comprising a heating receptacle shaped to frictionally engage the bottom portion of the bottle, a strip hinged to the receptacle and having a portion formed into a handle, resilient clamp bands projecting from the strip, a ring fitting the mouth of the bottle and formed into a lip, and a lid hinged to the strip and coöperating with the ring to cover the mouth of the bottle.

In testimony whereof I affix my signature.

ARTHUR R. SCHRADER.